US012803354B2

(12) United States Patent
Trachsel et al.

(10) Patent No.: US 12,803,354 B2
(45) Date of Patent: Nov. 17, 2026

(54) ROTOR FOR AN OUTRUNNER MOTOR AND OUTRUNNER MOTOR COMPRISING THE ROTOR

(71) Applicant: Maxon International AG, Sachseln (CH)

(72) Inventors: Mathis Trachsel, Lungern (CH); Johannes Kreher, Lungern (CH); Andreas Gasser, Sarnen (CH); Christian Wuthrich, Sachseln (CH)

(73) Assignee: Maxon International AG, Sachseln (CH)

(*) Notice: Subject to any disclaimer, the term of this patent is extended or adjusted under 35 U.S.C. 154(b) by 183 days.

(21) Appl. No.: 18/705,516

(22) PCT Filed: Oct. 28, 2022

(86) PCT No.: PCT/EP2022/080174
§ 371 (c)(1),
(2) Date: Apr. 26, 2024

(87) PCT Pub. No.: WO2023/073158
PCT Pub. Date: May 4, 2023

(65) Prior Publication Data
US 2025/0015653 A1 Jan. 9, 2025

(30) Foreign Application Priority Data
Oct. 29, 2021 (EP) .................................... 21205609

(51) Int. Cl.
*H02K 1/2791* (2022.01)
*H02K 1/16* (2006.01)
(Continued)

(52) U.S. Cl.
CPC ............. *H02K 1/2791* (2022.01); *H02K 1/16* (2013.01); *H02K 1/24* (2013.01); *H02K 7/04* (2013.01); *H02K 2213/03* (2013.01)

(58) Field of Classification Search
CPC .. H02K 1/2791; H02K 1/2789; H02K 1/2786; H02K 1/16; H02K 1/24;
(Continued)

(56) References Cited

U.S. PATENT DOCUMENTS 3,546,505 A * 12/1970 Morris .................. H02K 7/061 310/90
4,143,288 A * 3/1979 Sato ....................... H02K 23/56 310/68 R
(Continued)

FOREIGN PATENT DOCUMENTS

CN 1367569 A * 9/2002 ............... H02K 7/06
CN 100370681 C * 2/2008 ............. H02K 7/063
(Continued)

OTHER PUBLICATIONS

Machine Translation of DE 102017123085 A1 (Year: 2019).*
(Continued)

*Primary Examiner* — Alexander A Singh
*Assistant Examiner* — Charlie Frank Mann, Jr.
(74) *Attorney, Agent, or Firm* — Dickinson Wright PLLC

(57) ABSTRACT

The outrunner motor includes a rotor housing designed as a rotor bell with rotor poles situated in the rotor bell. The rotor bell is mountable in a stator of the outrunner motor so as to be rotatable about an axis of rotation and exhibits a rigidity that is asymmetrical in relation to the axis of rotation, in particular an asymmetrical tilting rigidity. The outrunner motor also has a motor shaft, a stator with a plurality of stator teeth, and a rotor surrounding the stator. The rotor allows the outrunner motor to be quieter and have lower
(Continued)

levels of vibration. The center of gravity of the rotor bell is located on an axis of rotation.

15 Claims, 5 Drawing Sheets

(51) Int. Cl.
*H02K 1/24* (2006.01)
*H02K 7/04* (2006.01)

(58) Field of Classification Search
CPC .. H02K 1/22; H02K 7/04; H02K 7/00; H02K 2213/03; H02K 7/063
USPC .......................................................... 310/81
See application file for complete search history.

(56) References Cited

U.S. PATENT DOCUMENTS

| | | | | |
|---|---|---|---|---|
| 2006/0267427 | A1* | 11/2006 | Matsubara | H02K 7/063 310/81 |
| 2008/0290751 | A1* | 11/2008 | Hwang | H02K 1/146 310/156.01 |
| 2015/0340913 | A1 | 11/2015 | Cho et al. | |
| 2016/0329790 | A1* | 11/2016 | Li | H02K 29/03 |

FOREIGN PATENT DOCUMENTS

| | | | | | |
|---|---|---|---|---|---|
| CN | 109019269 | A | * | 12/2018 | B66B 11/043 |
| CN | 211266724 | U | | 8/2020 | |
| CN | 112994281 | A | * | 6/2021 | H02K 1/146 |
| DE | 102017123085 | A1 | * | 4/2019 | H02K 15/165 |
| WO | WO-2013170672 | A1 | * | 11/2013 | H02K 1/278 |
| WO | WO-2018092628 | A1 | * | 5/2018 | H02K 15/03 |

OTHER PUBLICATIONS

Machine Translation of CN 109019269 A (Year: 2018).*
Machine Translation of CN 100370681 C (Year: 2008).*
Machine Translation of CN 1367569 A (Year: 2002).*
Machine Translation of WO 2018092628 A1 (Year: 2018).*
Machine Translation of WO 2013170672 A1 (Year: 2013).*
Machine Translation of CN 112994281 A (Year: 2021).*
Jain Anuj Kumar et al: “A novel approach to study effects of asymmetric stiffness on parametric instabilities of multi-rotor-system”, Journal of Sound and Vibration, Elsevier, Amsterdam , NL, Bd. 413, Oct. 31, 2017 (Oct. 31, 2017), pp. 159-172, XP085301244, ISSN: 0022-460X, DOI: 10.1016/J.JSV.2017.10.27.
Chauvicort Fabien Et Sl: “Transversally Asymmetric Stiffness of Laminated Stator Core: A Solution for Noise Mitigation of Electric Machines”, IEEE Transactions on Energy Conversion, IEEE Service Center, Piscataway, NJ, US, Bd. 34, Nr. 2, Jun. 1, 2019 (Jun. 1, 2019), pp. 613-619, XP011724576, ISSN: 0885-8969, DOI: 10.1109/TEC2018.2865622 [May 14, 2019].

* cited by examiner

ROTOR FOR AN OUTRUNNER MOTOR AND OUTRUNNER MOTOR COMPRISING THE ROTOR

CROSS-REFERENCE TO RELATED APPLICATION

This application claims priority to PCT Patent Application No. PCT/EP2022/080174, filed on Oct. 28, 2022, entitled "ROTOR FOR AN OUTRUNNER MOTOR AND OUTRUNNER MOTOR COMPRISING A ROTOR," then entire contents of which is herein incorporated by reference.

BACKGROUND

1. Field

The present disclosure relates to a rotor for an outrunner motor and to an outrunner motor that has a rotor which surrounds a stator.

2. Related Art

Outrunner motors of this type are flat motors with a rather short axial length. The rotor is connected to the motor shaft by the unilateral rotor bell. It has been shown that the bell structure of the rotor housing of an outrunner motor is unfavorable in terms of noise and vibration, as it has low natural frequencies with little damping, a large mass on a large diameter, small bearing spacing and magnetic forces close to the outer diameter.

In order to keep the mass moment of inertia of the rotor low, the rotor bell must be configured with the thinnest possible walls, however this means that the rotor bell has low rigidity, which favors vibrations.

In particular, if these outrunner motors are adapted to high torque, they are subject to strong magnetic forces. In the real system, these magnetic forces lead to resulting force excitations, the amplitude and time course of which depend on imperfections in the geometry and material and other irregularities. In addition to the resulting driving torque, which acts between the rotor and stator, the magnetic forces act primarily in the radial direction, between the poles, i.e. between the magnets of the rotor and the stator teeth.

The natural frequencies of the motor are defined by the rigidity of elastic components and moving masses or inertia in accordance with the laws of physics. If a vibration excitation occurs in any form in the vicinity of the natural frequency, this leads to a strong increase in the vibration amplitude (resonance), wherein the vibration amplitude can only be limited by dissipating the vibration energy (damping).

By construction, the elastic elements of such an outrunner motor, which mainly participate in the vibration, are the rotor bell and the elastic contacts of the bearing, in particular ball bearings, wherein the rotor bell and bearing have very little damping, which is expressed by a strong increase in the vibration amplitude near resonance.

From CN 211266724 U, an end cover for permanent magnet synchronous motors is known, which comprises an end cover body and a plurality of reinforcing ribs arranged on the end cover body. The reinforcing ribs of the end cover of the permanent magnet synchronous motor are arranged asymmetrically. As a result, the problem of electromagnetic force waves resonating with the structural vibration of the motor under electromagnetic excitation of the motor can be solved, and working noise of the permanent magnet synchronous motor can be reduced.

CN 112271852 A also shows an end cover for a permanent magnet synchronous motor for noise reduction. The end cover has inner and outer reinforcing ribs, wherein the inner reinforcing ribs are also distributed asymmetrically.

In these two documents, the end cover, that is, a non-rotating part of the motor housing, is provided with asymmetrically arranged reinforcing ribs. This already leads to a reduction in noise and vibrations, however there is still room for improvement.

Furthermore, DE 10 2017 123085 A1 shows an outrunner motor with a stator having several electronically switchable poles and a rotor which is mounted so as to be rotatable relative to the stator and at least partially surrounds the stator. The rotor is pot-shaped and comprises a plurality of permanent magnets arranged one behind the other in the circumferential direction. The outrunner motor is adapted to compensate for an output imbalance caused by a drive train of the device in which the outrunner motor is installed. For this purpose, the outrunner motor has two counterweights to generate a defined unbalance. The first counter mass is formed on a part of the circumferential surface of the rotor and is formed in one piece with the rotor. The second counter mass can be configured such that partial areas of the end face of the pot-shaped rotor are punched out and bent over onto the remaining partial areas of the rotor end face.

SUMMARY

It is therefore the problem of the present disclosure to further improve the difficulties known from the prior art and, in particular, to configure a rotor for an outrunner motor and an outrunner motor having such a rotor so as to be quieter and with lower levels of vibration.

For this purpose, it is provided according to the disclosure that the center of gravity of the rotor bell is located on its axis of rotation.

The rotor bell is a pot-shaped housing that is at least partially closed on one side and has a shell surface and an end face. The tilting rigidity prevents the end face or the shell surface of the rotor bell from tilting in a direction perpendicular to it. The asymmetrical tilting rigidity is neither point-symmetrical nor rotationally symmetrical in relation to the axis of rotation. The rotor poles are preferably configured as permanent magnets. A bearing point is provided on or in the end face for mounting the rotor bell on one side of the motor shaft. The mathematical solution of the eigenvalue problem for solving the vibration differential equations for the main vibration modes in the circumferential direction is not defined. However, force excitations show clear components in the circumferential direction. This leads to the observation that the elastic relative tilting movement between the rotor and stator is associated with a circumferential movement. With this observation, the mechanical rotor structure can be optimized. While hardly any influence can be exerted on the tilting rigidity of the bearing, it is possible to optimize the tilting rigidity of the rotor bell. The bell structure of the rotor bell is therefore configured such that the tilting rigidity of the rotor bell varies irregularly as a function of the torsional angle when turning around the axis of rotation. On the one hand, the asymmetrical configuration of the tilting rigidity of the rotor bell in relation to the axis of rotation means that the tilting natural frequencies, which are usually close to each other in a symmetrical configuration, are strongly separated from each other. On the other hand, a tilting natural mode vibrating near resonance cannot simply rotate, as the tilting rigidity changes greatly depending on the angle around the axis of rotation, which manifests itself in a vibration or noise analysis through a splitting of the resonance peaks and thus through stronger damping with reduced vibration amplitudes. This configuration of the rotor bell thus enables additional damping and a reduction in excitation. Low unbalance and therefore quiet running of the motor is achieved.

According to a preferred embodiment, it can be provided that the rotor bell has areas of different geometry and/or made of different materials. This is a simple way of achieving the desired asymmetrical tilting rigidity of the rotor bell in relation to the axis of rotation. For example, it may be provided that the rotor bell has different thicknesses in the circumferential direction or is made of different materials.

In another preferred embodiment, it can be provided that an end face of the rotor bell that is perpendicular to the axis of rotation is asymmetrical. As a result, the desired asymmetrical tilting rigidity of the rotor bell is achieved in a simple and stable manner. The shell surface of the rotor bell can thereby be symmetrical, in particular axially symmetrical or rotationally symmetrical. This also enables the motor to run with low unbalance, as well as cost-effective production of the rotor bell.

Preferably, the end face of the rotor bell can then be configured such that it has at least one cutout and spokes, wherein the spokes are made of different materials and/or have different thicknesses or widths and/or include different angles between them. This leads to the asymmetrical tilting rigidity of the rotor bell according to the disclosure and thus to a reduction in noise and vibrations. In this case, the spokes extend from a bearing area in the end face of the rotor bell to the circumference of the rotor bell. In this embodiment, the first two tilting modes are strongly separated from each other and the tilting natural frequencies of the first two tilting modes lie between 100-500 Hz, particularly preferably between 300-500 Hz or more apart.

According to yet another embodiment, it may be provided that the spokes are arranged asymmetrically around the axis of rotation such that they are each arranged between two rotor poles. By arranging the spokes between the rotor poles, that is, the permanent magnets of the rotor, an unfavorable magnetic flux through the rotor bell, which could cause additional magnetic excitations, can be avoided. Preferably, the rotor return circuit is not saturated in the transition area to the spokes in order to better decouple the spoke structure from the magnetic circuit.

Preferably, the number of spokes is less than the number of rotor pole pairs formed by two rotor poles in each case, wherein preferably at least four spokes are provided. It is particularly preferred that the number of spokes corresponds to a prime number. This makes it easy to achieve the desired asymmetrical arrangement of the spokes in the end face of the rotor bell. In this case, it is particularly preferred that the number of spokes corresponds to the next two smallest prime numbers in relation to the number of rotor 10 pole pairs. In general, five or seven spokes and in particular five spokes are preferred.

Yet another preferred embodiment can provide that the spokes are arranged asymmetrically in relation to the axis of rotation and each include an angle that is as equal as possible. The spokes are thereby arranged as evenly distributed as possible. A preferred embodiment of a motor can provide that 12 rotor poles are arranged in the rotor bell and the end face has five spokes. In this configuration, adjacent spokes are spaced apart from each other by a minimum of two and a maximum of three rotor pole gaps or form an angle of at least 60° and at most 90° with each other. In such a configuration of the rotor bell, the tilting rigidity of the rotor bell, which counteracts tilting of the end face of the rotor bell in relation to this vertical tilting direction, is between 1 and 5 Nm/degree. In this case, the area of the rotor bell with the highest rigidity arranged in relation to the axis of rotation has a rigidity that is between 20-60% higher than the area with the lowest rigidity in relation to the axis of rotation.

Yet another preferred embodiment can provide that the rotor poles are arcuate on the radially outer side and flat on the radially inner side. Preferably, the rotor poles are configured as discrete anisotropic magnetic segments. This configuration of the rotor poles allows the course of the air gap flux density in the outrunner motor to be smoothed and the magnetic flux in the air gap ideally has a sinusoidal course. This avoids erratic and stronger excitations. At the same time, such rotor poles or magnets reduce costs compared to curved magnets, as the smooth surface requires less machining than a curved surface.

According to a further preferred embodiment, a ring-shaped damping element can be provided in the rotor. Preferably, the damping element is configured as a ring made of a plastic with good damping properties, such as glass fiber-reinforced PPA (polyphthalamide), which has high rigidity. The plastic ring comprises webs arranged evenly distributed along its circumferential surface in the circumferential direction. Preferably, the number of webs corresponds to the number of spaces between the rotor poles. The plastic ring is inserted into the rotor bell, preferably in such a way that the webs are positioned in the spaces between the rotor poles. Due to the high rigidity of the plastic ring, the shell surface of the rotor bell is additionally stabilized and the desired damping is achieved.

With regard to an outrunner motor with a motor shaft, a stator with a plurality of stator teeth and a rotor surrounding the stator as described above, the above-mentioned problem is solved in that the number of stator teeth is smaller than the number of rotor poles. Preferably, the outrunner motor is an electronically commutated outrunner motor. An optimized layout of the rotor and stator system also helps to reduce or avoid the noise and vibrations of the motor. It has been shown that a combination of 12 rotor poles to 8 stator teeth or 16 rotor poles to 12 stator teeth is preferred. For rotors with larger diameters, combinations of 28 rotor poles to 24 stator teeth or 40 rotor poles to 36 stator teeth can also be preferred. In general, ratios of 4 rotor poles to 3 stator teeth or 7 rotor poles to 6 stator teeth or 10 rotor poles to 9 stator teeth or multiples of these ratios are particularly suitable.

In another preferred embodiment, each of the stator teeth has a stator tooth head and the tangential distance between the rotor poles is greater than the tangential slot gap width between two stator tooth heads. In particular, the ratio of the tangential slot gap width between two stator tooth heads to the tangential distance between the rotor poles is between 0.5 and 0.85. This configuration also leads to reduced noise and vibration.

Another preferred embodiment can provide that the ratio of the tangential slot gap width between two stator tooth heads to the tangential width of a stator tooth head is <=0.25 and is preferably in a range between 0.11 and 0.2. A stator tooth head that is as wide as possible can reduce a reluctance change from the rotor's point of view over one rotation, which reduces the magnetic excitations. This also leads to a reduction in noise and vibration.

A further reduction in noise and vibration can be achieved by each stator tooth having a stator tooth neck around which a copper winding is arranged, wherein the width of the stator tooth neck is adapted such that the magnetic flux in the stator tooth neck does not reach the saturation range during motor operation.

Yet another preferred embodiment can provide that each of the stator teeth has a stator tooth head and an air gap is formed between the rotor and the stator, wherein the ratio between a width of the air gap and the tangential slot gap width between two stator tooth heads is in a range of 0.25 to 0.5. This resulting reduction in the air gap field can also prevent excitation of the system.

BRIEF DESCRIPTION OF THE DRAWINGS

Embodiments of the present disclosure are explained in more detail below with reference to drawings.

It is shown by.

DETAILED DESCRIPTION OF THE ENABLING EMBODIMENTS

Figure 1A:
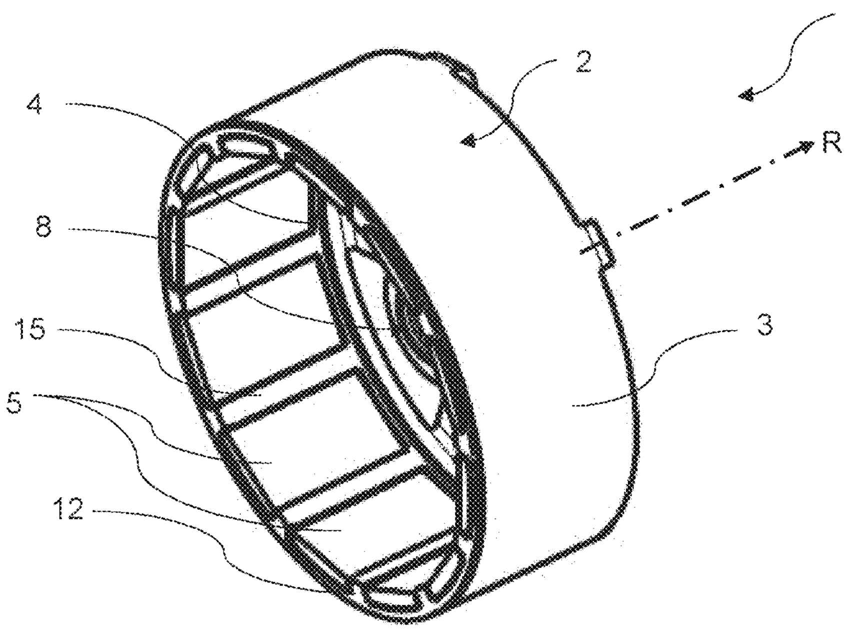
FIGS. 1*a, b*: perspective views of a first embodiment of a rotor.

FIG. 1*a* shows a perspective view of a first embodiment of a rotor 1 according to the disclosure for an outrunner motor, preferably an electronically commutated outrunner motor. The rotor 1 comprises a rotor housing configured as a rotor bell 2. The rotor bell 2 is therefore essentially bell-shaped or pot-shaped and comprises an essentially cylindrical shell surface 3 and an end face 4 running essentially perpendicular to the shell surface 3. A bearing point 8 is formed in the end face 4, with which the rotor bell 2 can be mounted on the motor shaft of an outrunner motor and thus in the stator. The rotor bell 2 also comprises an axis of rotation R, which extends through the bearing point 8. The axis of rotation R runs perpendicular to the end face 4 of the rotor bell 2. The rotor bell 2 is rotatable or mountable about the axis of rotation R in the outrunner motor.

A damping element 12 (plastic ring) is arranged in the rotor bell 2 on the inside of the shell surface 3. The damping element 12 comprises webs 15 which connect two circular end sections 13, 14. Rotor poles 5 are arranged between the webs 15 in the recesses of the damping element 12. The rotor poles 5 are arranged evenly around the circumference of the rotor bell on the inside of the shell surface 3. The rotor poles 5 are preferably configured as permanent magnets and preferably as discrete, anisotropic magnetic segments. Two rotor poles 5 each form a rotor pole pair. The rotor poles 5 are described in more detail below with reference to FIG. 3.

Outrunner motors of this type are characterized by a rather short axial length. The rotor 1 is connected to the motor shaft by the unilateral rotor bell 2. Such a bell structure for the rotor housing is rather unfavorable in terms of noise and vibration, as it has low natural frequencies with less damping, a large mass on a large diameter, small bearing spacing and magnetic forces close to the outer diameter.

According to the disclosure, the bell structure of the rotor bell 2 is therefore configured such that the tilting rigidity of the rotor bell 2 varies irregularly around the axis of rotation R as a function of the rotor angle. The tilting rigidity of the rotor bell 2 is thus asymmetrical in relation to the axis of rotation R. The asymmetrical tilting rigidity of the rotor bell 2 can be achieved, for example, by the rotor bell having areas of different geometry. These can be, for example, areas of different wall thicknesses or cutouts formed in the rotor bell. Another possibility is that areas of the rotor bell 2 are made of different materials. Advantageously, the asymmetry of the rotor bell 2 is configured such that the center of gravity of the rotor bell 2 is always on the axis of rotation R.

Figure 2A:
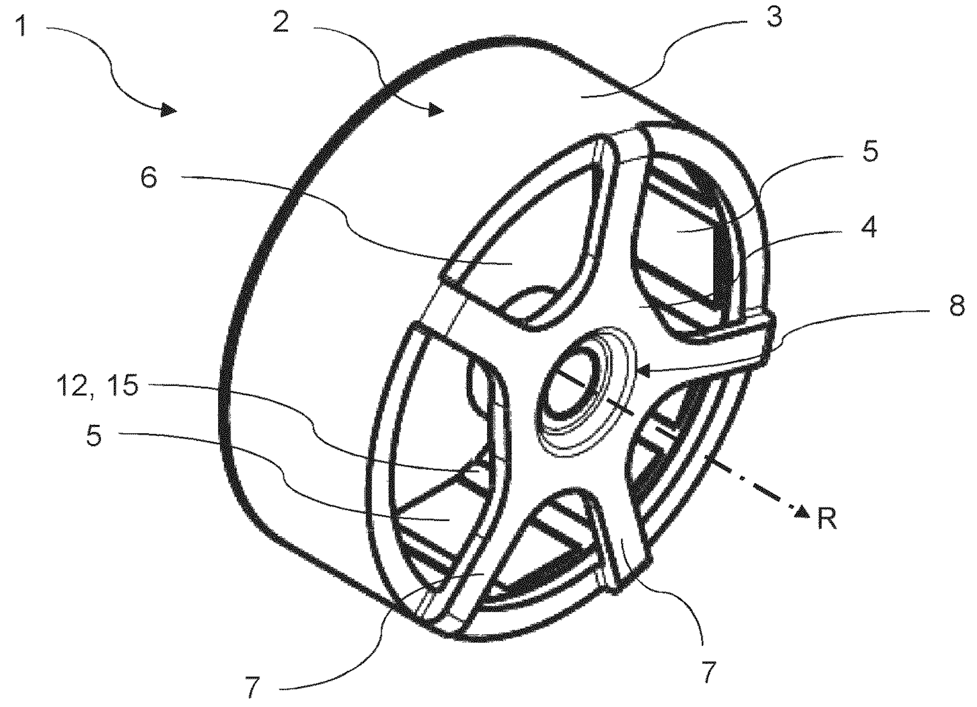
FIGS. 2*a, b*: further perspective views of the rotor from FIG. 1*a, b;*

In the embodiment shown in FIGS. 1*a, b* and 2*a, b*, the end face 4 of the rotor bell 2 is asymmetrically configured. This can be clearly seen in FIG. 2*a, b*. FIGS. 2*a, b* also show a perspective view of the rotor 1 from FIGS. 1*a, b*, wherein the rotor 1 can be seen from the other side along the axis of rotation R. The end face 4 of the rotor bell 2 has cutouts 6 and spokes 7. The spokes 7 extend from the bearing point 8 in a radial direction, i.e. perpendicular to the axis of rotation R, to the shell surface 3 of the rotor bell 2. The cutouts 6 are formed between the spokes 7. The center of gravity of the rotor bell 2 is located on the axis of rotation R. The spokes 7 and the cutouts 6 are explained in more detail below with reference to FIG. 3. With this configuration of the asymmetry of the rotor 1 or the rotor bell 2, it results that the first two tilting natural modes are strongly separated from each other and their tilting natural frequencies are preferably between 100 and 500 Hz apart.

In contrast to FIGS. 1*a* and 2*a*, FIGS. 1*b* and 2*b* show a perspective view of the rotor 1 without rotor poles 5 and damping element 12. The shell surface 3 of the rotor bell 2 in this case is cylindrical. Double arrows SR on the shell surface 3 of the rotor bell 2 indicate the directions in which the rotor bell 2 is excited to vibrate, mainly by the magnetic forces. The rotor bell 2 is thereby excited or elastically deformed essentially by the magnetic attraction forces and partly by magnetic repulsion forces between the stator teeth 18 and the rotor poles 5 in the radial direction SR. Partly due to the fact that the shell surface 3 is only connected to the axis of rotation R on one of the end faces 4 that is perpendicular to the shell surface 3 or perpendicular to the axis of rotation R, vibrations are also induced in the rotor bell 2 in the axial direction SA.

Figure 3:
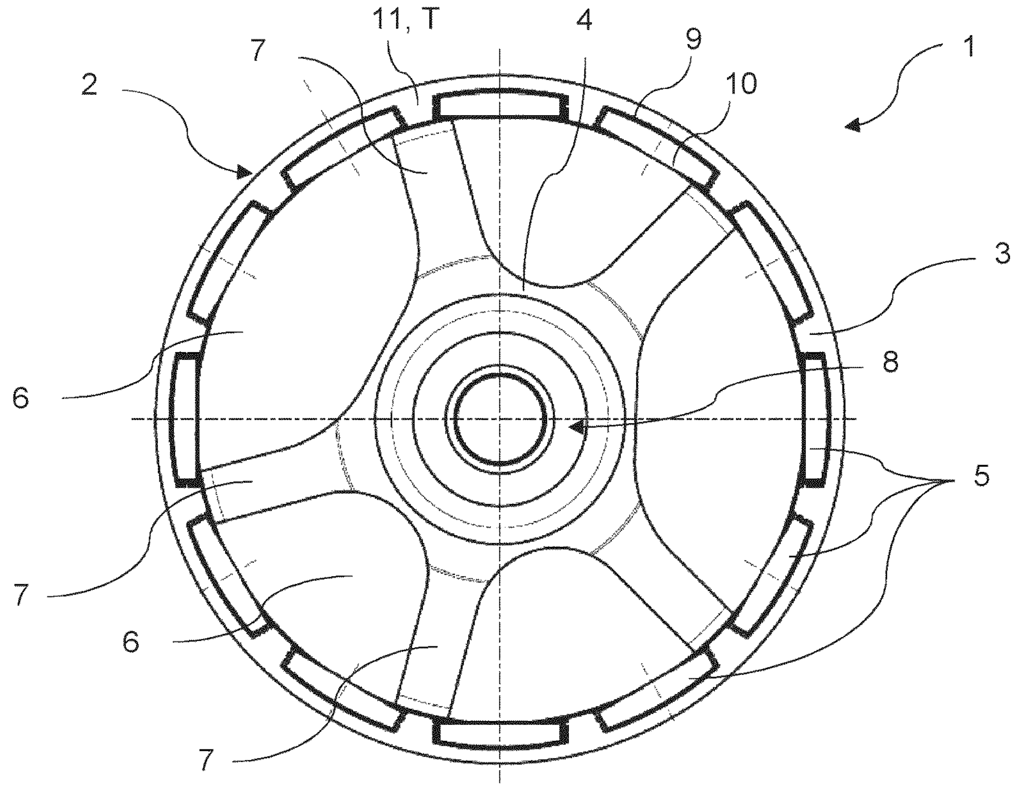
FIG. 3: view in axial direction of the rotor from FIG. 1*a, b;*

FIG. 3 shows an axial view of the rotor 1 of FIG. 1*a, b* with the rotor bell 2 according to the disclosure along the axis of rotation R. The asymmetrical configuration of the end face 4 of the rotor bell 2 is clearly visible here. The end face 4 has five spokes 7 distributed in the circumferential direction and also five cutouts 6 formed between the spokes 7. 12 rotor poles 5 are arranged evenly distributed in the shell surface 3 of the rotor bell 2. The neighboring rotor poles 5 in each case are arranged spaced apart from one another, so that a rotor pole gap 11 with a tangential distance T is formed between them. This arrangement therefore forms six rotor pole pairs in the rotor bell 2.

As already described, the rotor poles 5 are configured as discrete anisotropic magnetic segments. On their radially outer side 9, the rotor poles 5 are arcuate. On their opposite side, that is, on the radially inner side 10, the rotor poles 5 are flat. This allows the air gap flux density curve to be smoothed and the magnetic flux in the air gap between the rotor and the stator of the outrunner motor is ideally sinusoidal. This avoids erratic and stronger excitations. At the same time, the configuration of the rotor poles 5 in such a way reduces costs compared to curved magnets, as the smooth or flat surface, that is, the radially inner surface 10, requires less machining than a curved surface.

Each of the spokes 7 is arranged between two rotor poles 5 of the rotor 1. By arranging the spokes 7 between the rotor poles 5, an unfavorable magnetic flux through the rotor bell 2 can be avoided, which could cause additional magnetic excitations. Preferably, the rotor return circuit is not saturated in the transition area to the spokes in order to better decouple the spokes 7 from the magnetic circuit. The five spokes 7 are therefore distributed asymmetrically along the circumference of the end face 4 of the rotor bell 2. Preferably, the spokes 7 are arranged such that they enclose as equal an angle as possible between them or are arranged as evenly distributed as possible. As can be seen in FIG. 3, this means that the spokes 7 enclose a minimum of two and a maximum of three rotor pole gaps 11 between them. The angle spanned between two spokes 7 is a minimum of 60° and a maximum of 90°. The spokes 7 have different widths or thicknesses so that the center of gravity of the rotor bell 2 is always on the axis of rotation R. As can be seen in FIG. 3, in the first embodiment, the two upper spokes 7 are slightly wider than the three lower spokes 7. Alternatively, it would also be conceivable for the spokes to have different thicknesses or be made of different materials.

Figure 4:
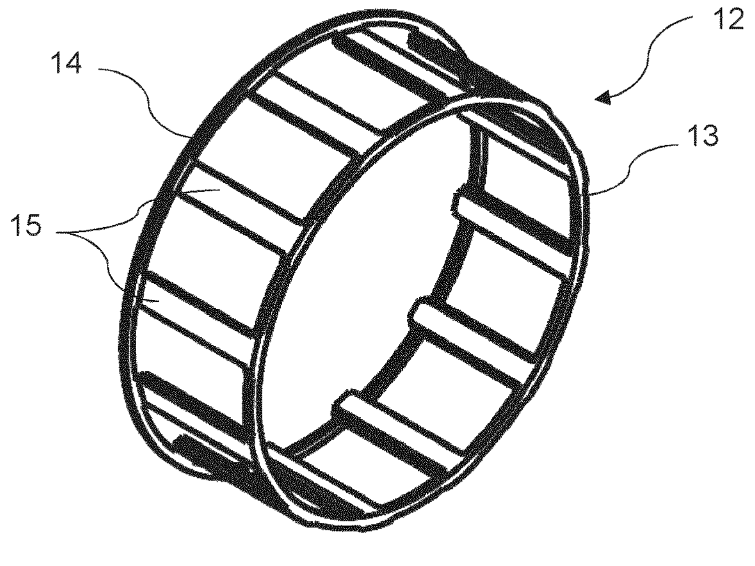
FIG. 4: perspective view of a damping element for a rotor.

FIG. 4 shows the damping element 12 in a single view, which is inserted in the rotor 1 shown in FIGS. 1*a*, 2*a* and 3. The damping element 12 is ring-shaped and comprises two circular end sections 13, 14, which are connected to each other via webs 15 running perpendicular to them. The webs 15 are dimensioned such that they can be inserted into the rotor pole gaps 11, as can also be seen in FIGS. 1*a*, 2*a* and 3. Preferably, the damping element 12 is made of a plastic material, in particular of glass fiber reinforced PPA (polyphthalamide), which has a high rigidity. This allows the shell surface of the rotor bell to be additionally stabilized and damped.

Figure 5:
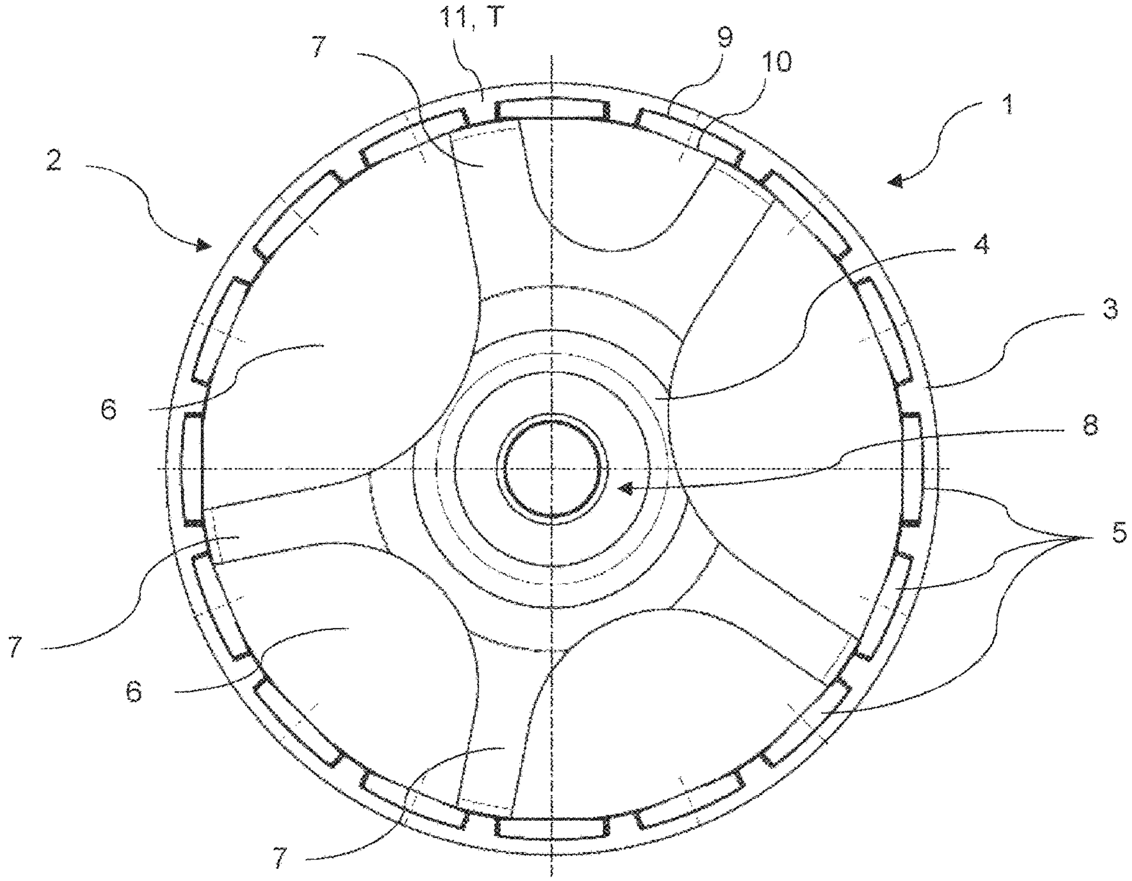
FIG. 5: further embodiment of a rotor in an axial view.

FIG. 5 shows a further embodiment of a rotor 1 for an outrunner motor. The rotor 1 shown in FIG. 5 is essentially structured in the same way as the rotor 1 already described. For the components not described below, reference is therefore made to the above description with regard to FIGS. 1 to 3. In the following, therefore, essentially only the differences will be discussed. In the embodiment shown in FIG. 5, 16 rotor poles 5 are arranged in the shell surface 3 of the rotor bell 2. Eight pairs of rotor poles are therefore formed in the rotor bell 2. The end face 4 of the rotor bell 2 again has five cutouts 6 and five spokes 7. The spokes 7 are arranged between the rotor poles 5. This leads to the advantages described above.

Other embodiments of the rotor bell are also possible. Preferably, the rotor bell is configured with a number of at least four spokes. Furthermore, the number of spokes of the rotor bell preferably corresponds to a prime number. The number of spokes is also preferably smaller than the number of rotor pole pairs. It is particularly preferred that the number of spokes corresponds to the next two smallest prime numbers in relation to the number of rotor pole pairs. In general, five or seven spokes and in particular five spokes are preferred.

Figure 6:
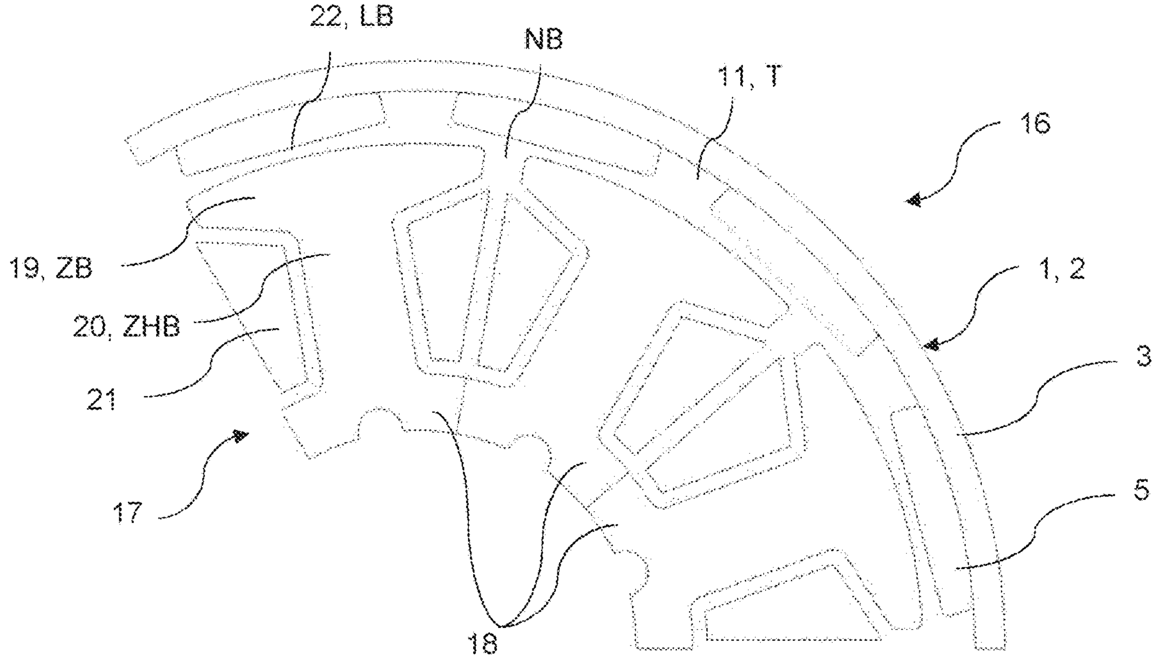
FIG. 6: section of an outrunner motor with a rotor and a stator in an axial view.

FIG. 6 shows a section of an outrunner motor 16. The outrunner motor 16 comprises a stator 17 and a rotor 1 according to the disclosure. The rotor 1 can, for example, be configured as shown in FIG. 1 to 3 or 5.

Outrunner motors with such rotors are subject to strong magnetic forces, especially if they are adapted to high torque. Ideally, these magnetic forces cancel each other out. In the real system, however, they lead to resulting force excitations, the amplitude and time course of which depend on imperfections in the geometry and material and other irregularities. In addition to the resulting driving torque, which acts between the rotor and stator, the magnetic forces act primarily in the radial direction, between the rotor poles of the rotor and the stator teeth.

The natural frequencies of the motor are defined by the rigidity of elastic components and moving masses or inertia according to the laws of physics. If a vibration excitation occurs in any form in the vicinity of the natural frequency, this leads to a strong increase in the vibration amplitude (resonance), wherein the vibration amplitude can only be limited by dissipating the vibration energy (damping). Due to the construction, the elastic elements of such an outrunner motor, which mainly participate in the vibration, are the rotor bell and the elastic contacts of the bearing, in particular ball bearings, wherein the rotor bell and bearing have very little damping, which is expressed by a strong increase in the vibration amplitude near resonance. Any additional damping and any reduction in excitation is therefore very welcome in order to make outrunner motors quieter and with a lower level of vibration.

The mathematical solution of the eigenvalue problem for solving the vibration differential equation for the main vibration modes in the circumferential direction is not defined. However, force excitations show clear components in the circumferential direction. From this it can be concluded that the elastic relative tilting movement between rotor and stator is associated with a circumferential movement. With this observation, the mechanical rotor design was optimized as described above.

The rotor 1 therefore comprises a rotor bell 2 with a shell surface 3. The rotor poles 5 are arranged in or on the shell surface 3. The rotor 1 can be configured according to one of the two embodiments mentioned above and is therefore not described in more detail below. Reference is made to FIGS. 1 to 3 and 5.

The stator 17 comprises a plurality of stator teeth 18. Each stator tooth 18 comprises a stator tooth head 19 and a stator tooth neck 20. A copper winding 21 is arranged around each stator tooth neck 20. Preferably, the rotor 1 has more rotor poles 5 than stator teeth 18. In particular, a combination of 12 rotor poles to 8 stator teeth or 16 rotor poles to 12 stator teeth is preferred. For rotors with larger diameters, combinations of 28 rotor poles to 24 stator teeth or 40 rotor poles to 36 stator teeth can also be preferred. In general, ratios of 4 rotor poles to 3 stator teeth or 7 rotor poles to 6 stator teeth or 10 rotor poles to 9 stator teeth or multiples of these ratios are particularly suitable.

In a preferred embodiment, the tangential distance T of the rotor poles 5, that is, the width of the rotor pole gaps 11, is greater than the tangential slot gap width NB between two stator tooth heads 19. In particular, the ratio of the tangential slot gap width NB to the tangential distance T of the rotor poles is preferably between 0.5 and 0.85.

Further preferred is the ratio of the tangential slot gap width NB to the tangential width ZB of a stator tooth head 19<=0.25 and is in particular in a range between 0.11 and 0.2. By having a stator tooth head 19 that is as wide as possible, non-linearities due to saturation of the magnetic flux in the stator tooth head 19 can be avoided and thus also resulting excitations.

In order to avoid non-linearities and thus vibration excitation, the stator tooth neck 20, around which the copper winding 21 is arranged, should be adapted with a sufficient width ZHB so that the magnetic flux in the stator tooth neck 20 does not reach the saturation range during motor operation.

An air gap 22 is formed between the rotor 1 and the stator 17. In this case, a width LB of the air gap 22 between rotor 1 and stator 17 is configured to be relatively large, so that a ratio of the width LB of the air gap 22 to the tangential slot gap width NB between two stator tooth heads 19 is between 0.25 and 0.5. This resulting reduction in the air gap field can also prevent excitation of the system.

FIGS. 7*a-e* show views in the axial direction of the deformation in the radial direction of a shell surface 3 of a rotor 1 of the outrunner motor 16. The shell surface 3 is deformed by the magnetic forces acting between the rotor 1 and the stator 17. In order to be able to generate a high torque with the motor, particularly strong magnetic forces must act between the rotor 1 and the stator 17. These forces deform the shell surface 3 depending on the rigidity of the rotor 1, wherein the rotor bell 2 and in particular the rotor shell 3 should have the lowest possible material thickness to avoid mass moment of inertia. Due to the low material thickness, vibrations can occur more easily or vibrations are damped less.

Figure 1B:
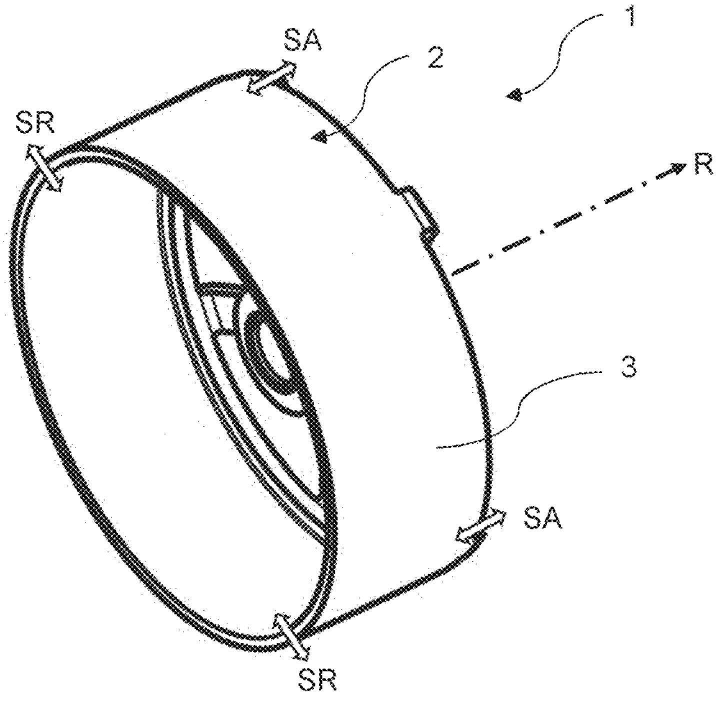
Figure 2B:
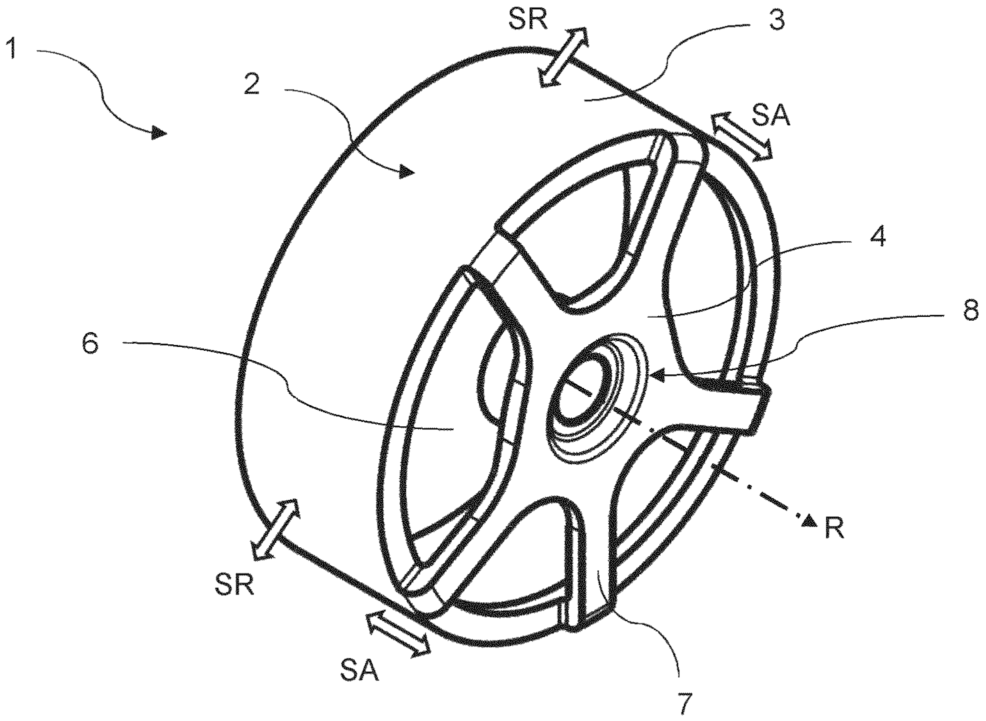
Figures 7A, 7B, 7C, 7D, 7E:
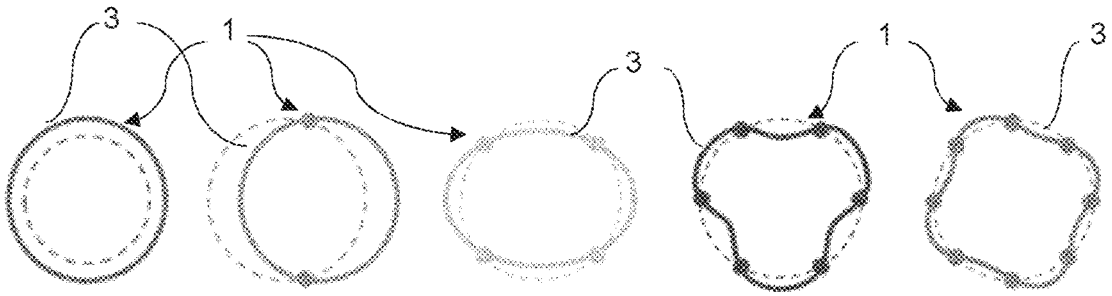
FIGS. 7*a-e*: view in axial direction of the deformation in radial direction of a shell surface of a rotor.

Depending on, for example, the number of rotor poles, the number of stator teeth 18 or the current applied to the stator teeth 18, the shell surface 3 can be excited to vibrate differently, as shown in FIG. 7. FIG. 7*a* shows a shell surface 3 which is compressed by the magnetic attraction forces. In FIG. 7*b*, the shell surface 3 vibrates around two nodes or points. In particular, vibration around two nodes results in a 3-dimensional form of vibration in the axial and radial direction, as shown in FIGS. 1*b* and 2*b*, in which the rigidity of the ball bearing contacts is also significantly involved. FIG. 7*c* shows a vibration of the shell surface 3 around four nodes. Depending on the natural frequency of rotor 1 and the motor speed, excitation at the natural frequency of rotor 1 creates a resonance at which the motor vibrates more strongly and thus generates noise and/or vibrations. When vibrating around two nodes, vibrations are predominantly generated by the motor, while vibrations around four, six or eight nodes tend to generate noise through the rotor 1. Due to the asymmetrical rigidity of the rotor bell, the resonance is broken up and divided into several resonance frequencies, which vibrate less strongly, thereby reducing the motor vibrations and/or the noise. FIGS. 7*d* and 7*e* show vibrations of the shell surface 3 around six and eight points respectively.

REFERENCE SIGNS

1 rotor
2 rotor bell
3 shell surface
4 end face
5 rotor pole
6 cutout
7 spoke
8 bearing point
9 radially outer side of the rotor pole
10 radially inner side of the rotor pole
11 rotor pole gap
12 damping element
13 end section
14 end section
15 web
16 outrunner motor
17 stator
18 stator tooth
19 stator tooth head
20 stator tooth neck
21 copper winding
22 air gap
R axis of rotation
SA vibration in the axial direction
SR vibration in the radial direction
T tangential distance of the rotor poles
NB tangential slot gap width
ZB tangential width of the stator tooth head
LB air gap width
ZHB tooth neck width

What is claimed is:

1. A rotor for an outrunner motor comprising a rotor housing designed as a rotor bell with rotor poles situated therein, wherein the rotor bell is mountable in a stator of the outrunner motor so as to be rotatable about an axis of rotation and exhibits a tilting rigidity that is asymmetrical in relation to the axis of rotation wherein the center of gravity of the rotor bell is located on its axis of rotation.

2. The rotor according to claim 1, wherein the rotor bell has areas of at least one of different geometry and different materials.

3. The rotor according to claim 1, wherein an end face of the rotor bell, which is formed perpendicular to the axis of rotation, is configured asymmetrically.

4. The rotor according to claim 3, wherein the end face of the rotor bell comprises at least one cutout and spokes, wherein the spokes have at least one of different materials, different thicknesses, different widths, and different angles between them.

5. The rotor according to claim 4, wherein the spokes are arranged asymmetrically around the axis of rotation such that they are each arranged between two rotor poles.

6. The rotor according to claim 4, wherein the number of spokes is smaller than a number of rotor pole pairs formed by two rotor poles in each case and wherein the number of spokes corresponds to one of the next two smallest prime numbers in relation to the number of rotor pole pairs.

7. The rotor according to claim 4, wherein the spokes are arranged asymmetrically in relation to the axis of rotation and each enclose an angle that is as equal as possible.

8. The rotor according to claim 1, wherein the rotor poles are arcuate on a radially outer side and flat on a radially inner side.

9. The rotor according to claim 1, wherein a ring-shaped damping element is inserted into the rotor bell.

10. An outrunner motor with a motor shaft, a stator with a plurality of stator teeth and a rotor surrounding the stator according to claim 1, wherein the number of stator teeth is smaller than the number of rotor poles.

11. The outrunner motor according to claim 10, wherein each of the stator teeth has a stator tooth head and a tangential distance between the rotor poles is greater than a tangential slot gap width between two stator tooth heads, wherein the ratio of the tangential slot gap width to the tangential distance between the rotor poles is between 0.5 and 0.85.

12. The outrunner motor according to claim 10, wherein each of the stator teeth has a stator tooth head and the ratio of tangential slot gap width between two stator tooth heads to a tangential width of the stator tooth head is less than or equal to 0.25.

13. The outrunner motor according to claim 10, wherein each stator tooth has a stator tooth neck around which a copper winding is arranged, wherein the width of the stator tooth neck is configured such that the magnetic flux in the stator tooth neck does not reach the saturation range during motor operation.

14. The outrunner motor according to claim 10, wherein each of the stator teeth has a stator tooth head and an air gap is formed between the rotor and the stator, wherein the ratio between a width of the air gap and a tangential slot gap width between two stator tooth heads lies in a range of 0.25 to 0.5.

15. The outrunner motor according to claim 10, wherein the ratio of a tangential slot gap width between two stator tooth heads to a tangential width of the stator tooth head is in the range of 0.11 to 0.2.

* * * * *